United States Patent
Brimshan et al.

(10) Patent No.: US 10,320,979 B2
(45) Date of Patent: Jun. 11, 2019

(54) DATA STRUCTURE DRIVEN INTERACTIVE VOICE RESPONSE (IVR) FRAMEWORK

(71) Applicant: Verizon Patent and Licensing Inc., Arlington, VA (US)

(72) Inventors: Michael Brimshan, Old Bridge Township, NJ (US); Robert Paul Pittman, Cumming, GA (US); Rakshit Yagnik, Bedminster, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 13 days.

(21) Appl. No.: 15/699,452

(22) Filed: Sep. 8, 2017

(65) Prior Publication Data

US 2019/0082050 A1    Mar. 14, 2019

(51) Int. Cl.
*H04M 3/493*    (2006.01)
*G06F 16/61*    (2019.01)
*G06F 16/68*    (2019.01)
*G06Q 30/00*    (2012.01)

(52) U.S. Cl.
CPC .......... *H04M 3/493* (2013.01); *G06F 16/61* (2019.01); *G06F 16/686* (2019.01); *G06Q 30/016* (2013.01)

(58) Field of Classification Search
CPC .......... H04M 3/493; H04M 2203/254; H04M 3/4936; H04M 3/4938; H04M 3/5166; H04M 2203/252; H04M 1/72583; H04M 2201/38; H04M 2201/40; H04M 3/42068; H04M 3/42221; H04M 3/42382; H04M 7/0027; H04M 1/72522; H04M 2201/42; H04M 2203/02

USPC .......... 379/88.01, 88.16, 88.22, 265.02, 85, 379/88.11, 88.13, 88.17, 88.18, 10.01, 379/142.06, 189, 1.02, 201.03, 211.02, 379/212.01, 218, 220.01, 265.01, 266.07, 379/88.02, 88.23, 93.01

See application file for complete search history.

(56) References Cited

U.S. PATENT DOCUMENTS

| | | | | |
|---|---|---|---|---|
| 7,411,942 | B1 * | 8/2008 | Croak | G06Q 10/109 370/352 |
| 8,085,929 | B2 * | 12/2011 | Subramaniam | H04M 3/42017 370/352 |
| 8,155,280 | B1 * | 4/2012 | Or-Bach | H04M 3/493 379/88.13 |
| 8,315,363 | B2 * | 11/2012 | Phelps | H04M 3/42221 370/352 |
| 8,345,835 | B1 * | 1/2013 | Or-Bach | G06Q 30/0269 379/114.13 |

(Continued)

*Primary Examiner* — Akelaw Teshale (57) ABSTRACT

A device may receive, from a server device, a request for an initial action associated with an interactive voice response (IVR) service. The request may include a service identifier. The device may obtain a set of code segments for an IVR application that supports the IVR service by using the service identifier to search a data structure. The set of code segments may be associated with logic of the IVR application. The device may provide instructions associated with an initial code segment to the server device to cause the server device to execute the initial action via a communication with a user device. The device may selectively provide, to the server device, instructions associated with another code segment to cause the server device to execute a next action via the communication with the user device.

20 Claims, 7 Drawing Sheets

(56) References Cited

U.S. PATENT DOCUMENTS

| | | | | |
|---|---|---|---|---|
| 8,379,831 B2* | 2/2013 | Velusamy | ............... | H04M 3/51 |
| | | | | 379/265.06 |
| 8,619,957 B2* | 12/2013 | Delacey | .............. | H04L 65/1069 |
| | | | | 370/352 |
| 8,661,112 B2* | 2/2014 | Creamer | ........... | H04M 3/42059 |
| | | | | 379/88.16 |
| 8,929,517 B1* | 1/2015 | Lavian | .................. | H04M 3/493 |
| | | | | 379/88.11 |
| 2008/0101336 A1* | 5/2008 | Kumarasamy | .......... | H04L 12/66 |
| | | | | 370/352 |
| 2011/0211679 A1* | 9/2011 | Mezhibovsky | ... | H04M 3/42382 |
| | | | | 379/88.18 |
| 2013/0080898 A1* | 3/2013 | Lavian | ...................... | G06F 3/16 |
| | | | | 715/728 |

* cited by examiner

DATA STRUCTURE DRIVEN INTERACTIVE VOICE RESPONSE (IVR) FRAMEWORK

BACKGROUND

Interactive voice response (IVR) is a technology that allows a computer to interact with humans through the use of voice and dual-tone multi-frequency signaling (DTMF) tones input via keypad. IVR technology allows customers to interact with a company's host system via a telephone keypad or by voice, after which services may be inquired about through an IVR dialogue. IVR systems may respond with prerecorded or dynamically generated audio to further direct users on how to proceed.

DETAILED DESCRIPTION OF PREFERRED EMBODIMENTS

The following detailed description of example implementations refers to the accompanying drawings. The same reference numbers in different drawings may identify the same or similar elements.

An IVR vendor may provide an integrated development environment (IDE) tool that a developer may use to create an IVR application. However, developing an IVR application on an IVR vendor-provided IDE tool may inhibit application development and/or reduce application flexibility. For example, if a network service provider selects a new IVR vendor, the IVR application may require substantial modifications to be supported on an IDE that is specific to the new IVR vendor.

Some implementations described herein provide an IVR application platform that orchestrates delivery of an IVR service to a user device by searching a data structure (e.g., via a query) for code segments that may be used to dynamically execute an IVR application. For example, the IVR application platform may receive a request for an IVR service, and may query a data structure for code segments needed to execute an IVR application associated with the IVR service. In this case, the IVR application platform may identify and translate code segments to instructions capable of being processed by an IVR media platform, and may provide the instructions to the IVR media platform to cause the IVR media platform to provide the IVR service to the user device.

In this way, the IVR application platform orchestrates delivery of an IVR service to a user device using code segments obtained from a data structure. Furthermore, the IVR application platform conserves processing resources relative to an IVR application platform that stores logic code locally. For example, if an IVR application is supported on 100 or more server devices in a data center, the IVR application may be updated or replaced by updating the data structure used to store the code segments associated with the IVR application (rather than updating application code on each server device, which may be tightly coupled to an IVR vendor-provided IDE).

Additionally, the IVR application platform conserves processing resources that might otherwise be spent on portions of the application that are not implemented or that are outdated. The IVR application platform is not tied to IVR vendor/system-specific restraints and is quickly implemented and adaptable to rapid changes in system development. The IVR application platform further reduces utilization of network resources by reducing a number of resources that need to be used to address problems relating to application design changes.

Additionally, by separating logic code from the specific IVR vendor/system, the IVR application is more quickly able to integrate with other systems, thereby conserving processing and/or network resources that are used carry out system integration processes. Furthermore, separating logic code from the IVR vendor/system allows the logic code to be developed without needing to adhere to requirements or constraints associated with the IVR vendor/system, thereby allowing more efficient logic code to be implemented (e.g., logic code that conserves processing resources relative to logic code that is developed in accordance with IVR vendor/specific system requirements or constraints).

Additionally, by storing logic code in a uniform data structure, the IVR application platform conserves processing resources. For example, code can be re-used in multiple IVR applications, conserving memory and storage; reducing development times and conserving processing resources.

FIGS. 1A-1D are diagrams of an overview of an example implementation 100 described herein. As shown in FIGS. 1A-1D, example implementation 100 may include an IVR application platform that interacts with an IVR media platform to orchestrate delivery of an IVR service to a user device.

Figure 1A:
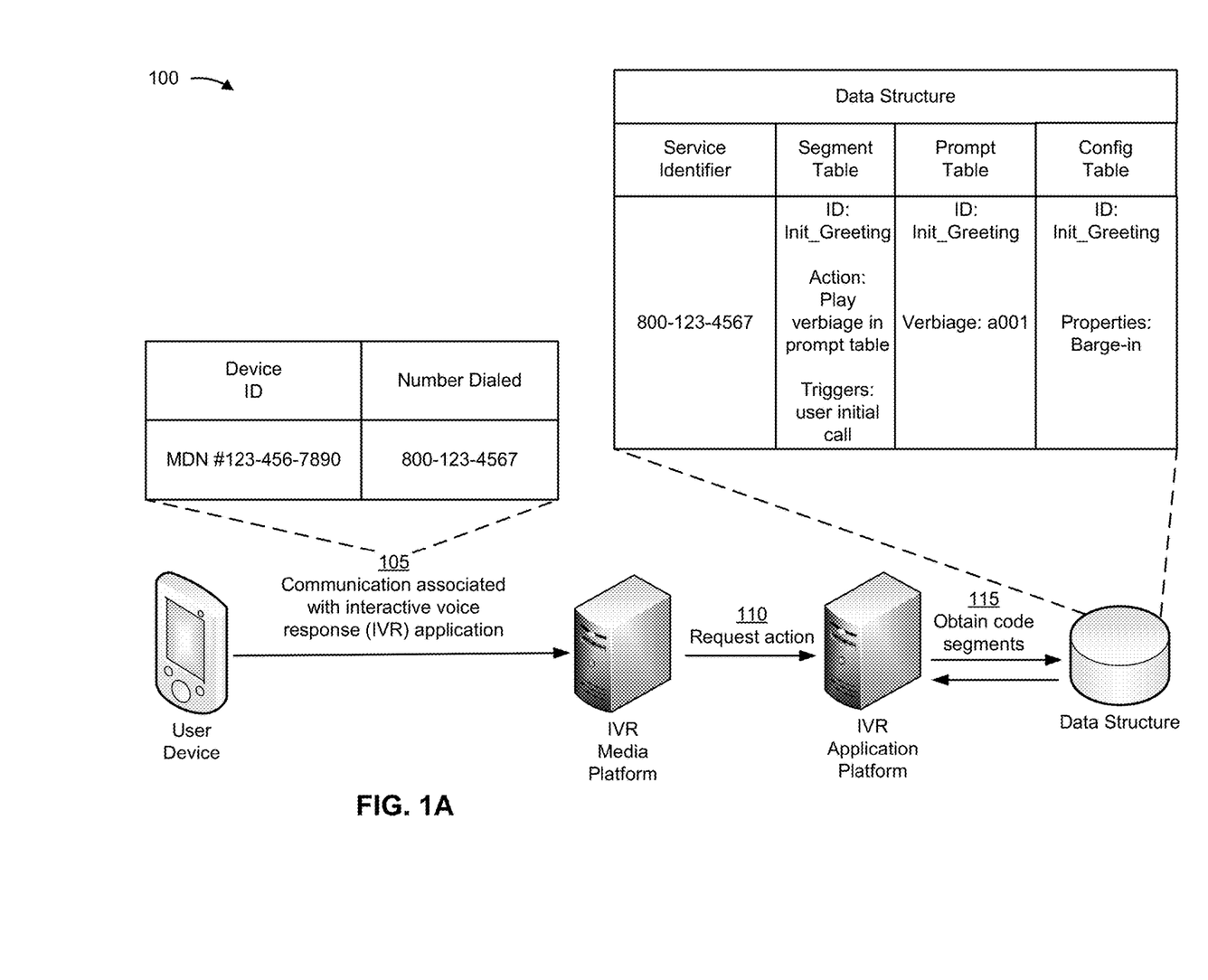
FIGS. 1A-1D are diagrams of an overview of an example implementation described herein.

As shown in FIG. 1A, and by reference number 105, the IVR media platform may receive, from the user device, a communication associated with an IVR service. For example, a user may interact with the user device to call a number associated with an IVR service (e.g., 1-800-123-4567). In this case, the IVR media platform may receive the call to establish a communication session between the user device and the IVR media platform.

As shown by reference number 110, the IVR application platform may receive, from the IVR media platform, a request for an action associated with the IVR service. For example, assume the IVR media platform provides media services for an IVR service (e.g., voice communications to the user device), and that the IVR application platform provides logic associated with the IVR service. In this case, the IVR media platform may generate a request for an initial action associated with the IVR service, and may provide the request to the IVR application platform. The request may include a device identifier (e.g., a mobile directory number (MDN), such as MDN 123-456-7890) and a service identifier (e.g., 800-123-4567) that may be identified using, for example, a dialed number identification service (DNIS).

As shown by reference number 115, the IVR application platform may obtain a set of code segments from a data structure. For example, the IVR application platform may use the service identifier to search (e.g., query) a data structure for a matching service identifier that is associated with a set of code segments. Additionally, the data structure may be a database, a flat file, an array, a linked-list, a hash table, or the like. A code segment may include one or more lines of code that may be used to carry out logic of an IVR application, such as identifying a message to play for the user device (e.g., a menu of options, an announcement, etc.), obtaining customer account information, establishing a call between the user device and a device of a customer service agent, and/or the like. In this way, the IVR application platform is able to obtain and store the set of code segments locally (e.g., so that the data structure does not need to be queried each time a user selects a new menu option).

Additionally, after obtaining the set of code segments associated with the IVR service, the IVR application platform may identify an initial code segment that may be used to provide an initial response to the call made by the user device.

As shown, the set of code segments may be stored using a segment table, a prompt table, and a configuration table. For example, the segment table may include a code segment identifier for a current code segment (e.g., "ID: Init_Greeting"), an action field indicating an action to take that is associated with the current code segment, a list of triggers for the current code segment (e.g., an initial call of a user device), a list of triggers for a next code segment (e.g., if a user inputs a 1, trigger code segment X, if a user inputs a 2, trigger code segment Y, etc.), and/or the like.

The prompt table may include a code segment identifier, message information, such as a value indicating a particular announcement or a particular menu option (e.g., verbiage a001 may be a file with an initial greeting message), and/or the like. The configuration table may include application configuration information, such as whether a user may interrupt a menu and pre-emptively select an option (e.g., a "barge-in" property), a link to an external data source (e.g., a uniform resource locator (URL) to a production server that stores user account information), and/or the like.

In this way, the IVR application platform is able to obtain a set of code segments from a data structure that may be used to orchestrate delivery of an IVR service to the user device.

Figure 1B:
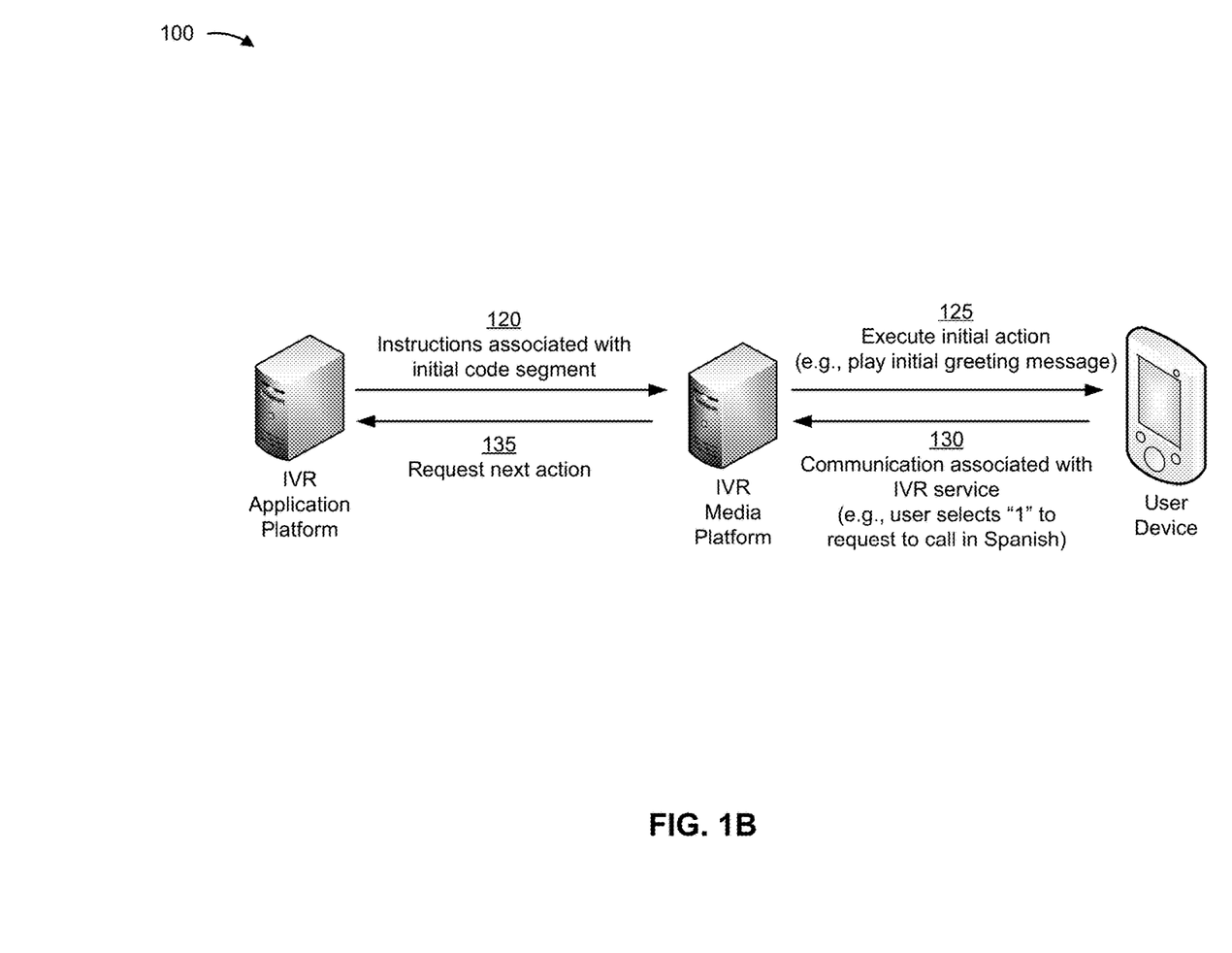

As shown in FIG. 1B, and by reference number 120, the IVR application platform may provide instructions associated with the initial code segment to the IVR media platform. For example, the IVR application platform may translate the initial code segment to instructions capable of being processed by the IVR media platform (e.g., an extensible markup language (XML) format, such as voice XML, an audio video interleave (AVL) format, etc.), and the IVR application platform may provide the instructions to the IVR media platform.

As shown by reference number 125, the IVR media platform may execute the initial action via the communication session with the user device. For example, IVR media platform may play an initial greeting message to the user device. As shown by reference number 130, the user device may provide, as part of the communication session, another communication associated with the IVR service. For example, the user may interact with the user device (e.g., via voice, via touchtone, etc.) to select "1" to request to hear menu options in Spanish.

As shown by reference number 135, the IVR media platform may provide, to the IVR application platform, a request for a next action associated with the IVR service. For example, the IVR media platform may provide a request that includes the value provided by the user device (e.g., the value associated with the selected option menu).

In this way, the IVR application platform is able to use code segments obtained from the data structure to orchestrate providing an IVR service to the user device.

Figure 1C:
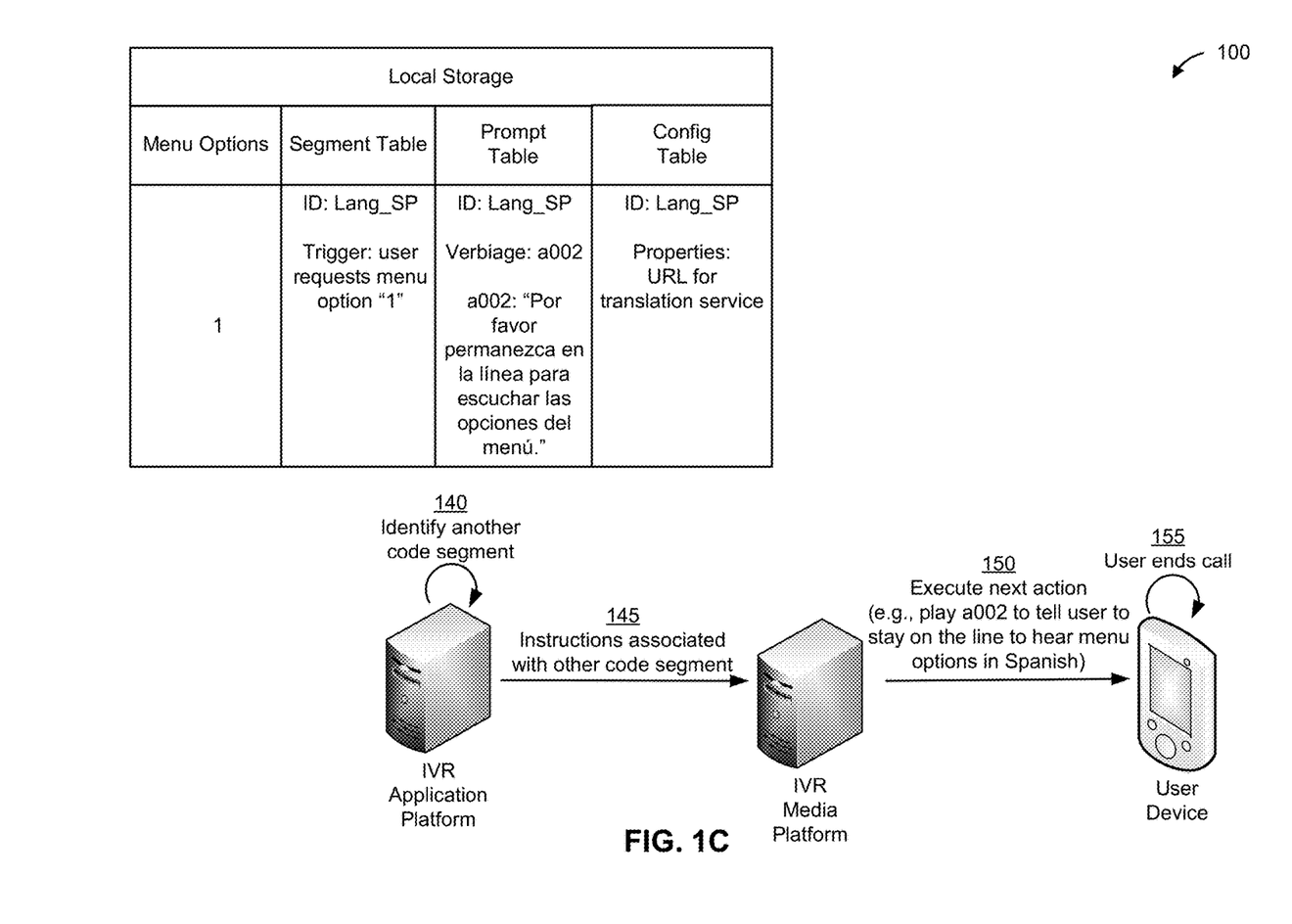

As shown in FIG. 1C, and by reference number 140, the IVR application platform may identify another code segment. For example, the IVR application platform may use the value associated with the selected menu option to identify a code segment associated with the next action. In this case, the IVR application platform may store the set of code segments using local storage (e.g., cache memory, a local database, etc.), and may identify a code segment identifier associated with the menu option provided by the user device (e.g., "ID: Lang_SP").

As shown by reference number 145, the IVR application platform may provide instructions associated with the other code segment to the IVR media platform. For example, the IVR application platform may translate the other code segment to instructions capable of being processed by the IVR media platform, and the IVR application platform may provide the instructions to the IVR media platform.

As shown by reference number 150, the IVR media platform may execute the next action via the communication session with the user device. For example, the IVR media platform may play, to the user device, an audio recording stating "por favor permanezca en la línea para escuchar las opciones del menú" (i.e., please stay on the line to hear the menu options (e.g., which may then be repeated in Spanish)). As shown by reference number 155, the user may interact with the user device to end the call.

In this way, the IVR application platform is able to use code segments obtained from a data structure to provide the user device with an IVR service.

Figure 1D:
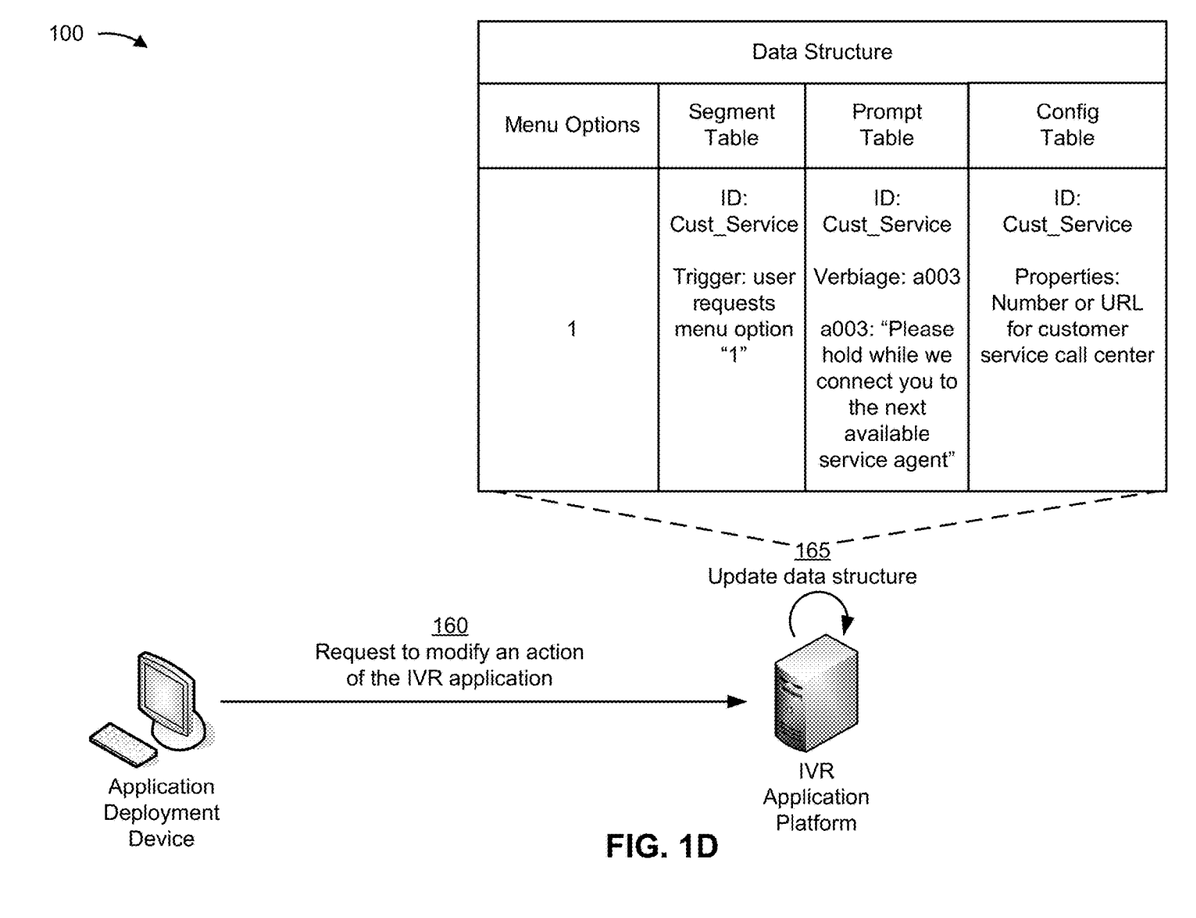

As shown in FIG. 1D, and by reference number 160, the IVR application platform may receive, from an application deployment device, a request to modify an action of the IVR application. For example, the IVR application platform may receive a request to modify menu option "1" to connect to a customer service agent. In this case, the request may include a new code segment that includes a message indicating that the user device is being connected to a customer service agent, a uniform resource locator (URL) or a number for a customer service call center (e.g., which can identify an available customer service agent), and/or the like.

As shown by reference number 165, the IVR application platform may update the data structure. For example, the IVR application platform may update the data structure by replacing the code segment associated with providing a user account balance with a new code segment that connects the user device to a customer service agent.

In this way, the IVR application platform is able to seamlessly modify an IVR application without requiring changes to an IDE of the IVR vendor. Furthermore, using a data structure to store a set of code segments conserves processing resources relative to an IVR application that stores logic locally in the IVR application code by allowing for seamless modifications or replacements of IVR applications.

As indicated above, FIGS. 1A-1D are provided merely as an example. Other examples are possible and may differ from what was described with regard to FIGS. 1A-1D. For example, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) of environment 100 may perform one or more functions described as being performed by another set of devices of environment 100.

Figure 2:
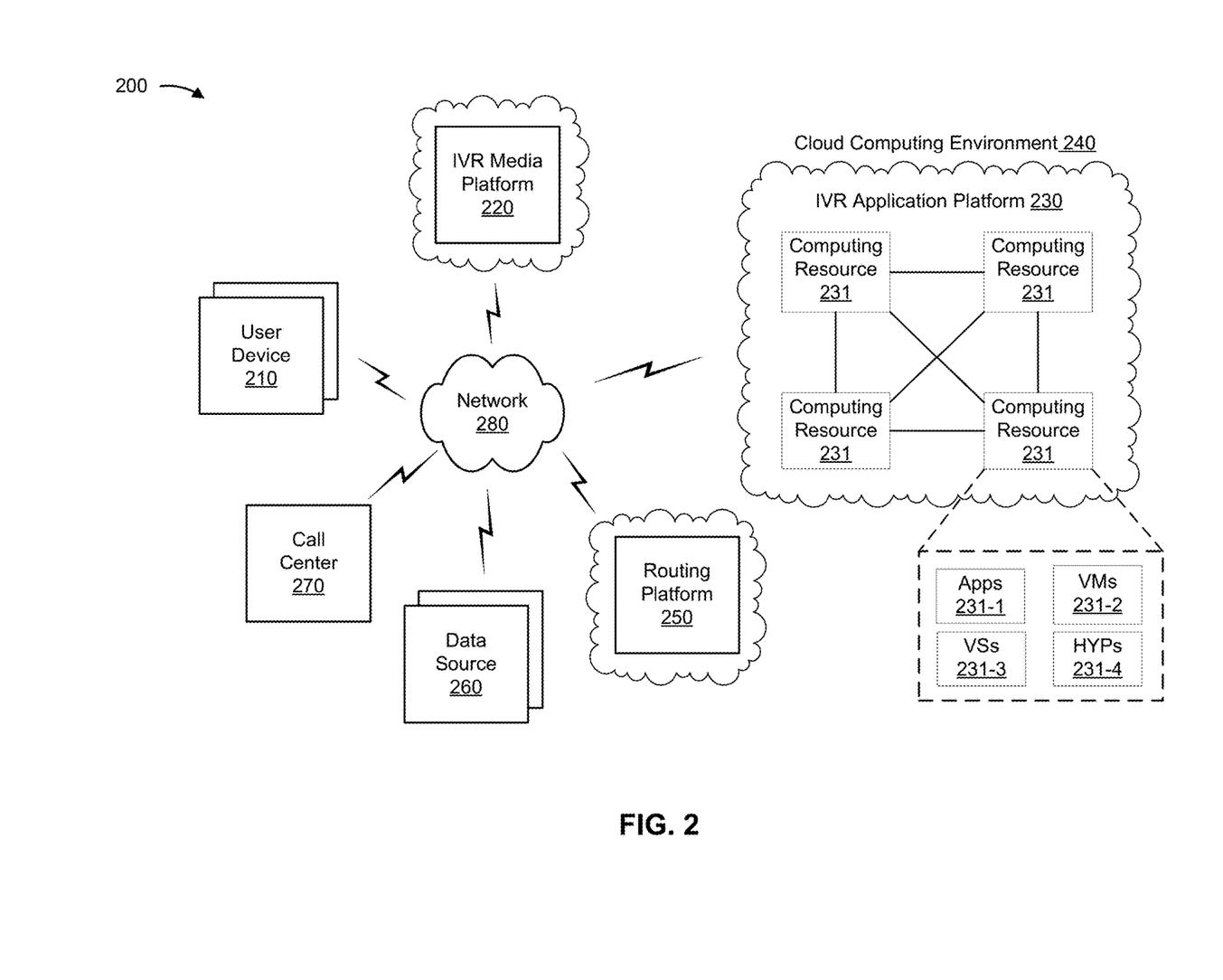
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, an IVR media platform 220, an IVR application platform 230 hosted within a cloud computing environment 240, a routing platform 250, a data source 260, a call center 270, and/or a network 280. Devices of environment 200 may interconnect via wired connections, wireless connections, or a combination of wired and wireless connections.

User device 210 includes one or more devices capable of receiving, generating, storing, processing, and/or providing information associated with an IVR communication. For example, user device 210 may include a communication and/or computing device, such as a phone (e.g., a mobile phone, such as a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

In some implementations, user device 210 may establish a communication session associated with an IVR service (e.g., by calling or messaging a particular service number). In some implementations, user device 210 may provide a communication to IVR media platform 220 as part of the communication session. For example, user device 210 may dial a number (e.g., a 1-800 number, a 1-900 number, etc.) to access a service associated with the number. In some implementations, user device 210 may receive, from IVR media platform 220, a voice response associated with the service.

IVR media platform 220 includes one or more devices capable of permitting human-computer interactions via use of voice and/or dual-tone multi-frequency signaling tones (e.g., input via a keypad of user device 210). For example, IVR media platform 220 may include a server device or a group of server devices (e.g., on-site server devices, cloud server devices, etc.), a server device supporting a voice response unit (VRU), a media server device, or a similar type of device. In some implementations, IVR media platform 220 may receive a communication from user device 210. In some implementations, IVR media platform 220 may provide a request for an action associated with an IVR service to IVR application platform 230. In some implementations, IVR media platform 220 may receive instructions from IVR application platform 230 to perform a particular action (e.g., to provide a particular voice response). In some implementations, IVR media platform 220 may execute the particular action via a communication session with user device 210.

In some implementations, as shown, IVR media platform 220 may be hosted in a cloud computing environment. Notably, while implementations described herein describe IVR media platform 220 as being hosted in a cloud computing environment, in some implementations, IVR media platform 220 might not be cloud-based (i.e., may be implemented outside of a cloud computing environment) or may be partially cloud-based.

IVR application platform 230 includes one or more devices capable of receiving, storing, processing, obtaining, and/or providing information associated with an IVR service. For example, IVR application platform 230 may include a server device or a group of server devices. In some implementations, IVR application platform 230 may receive, from IVR media platform 220, a request for an action associated with an IVR application. In some implementations, IVR application platform 230 may obtain a set of code segments from a data structure. In some implementations, IVR application platform 230 may provide instructions associated with a code segment to IVR media platform 220.

In some implementations, as shown, IVR application platform 230 may be hosted in cloud computing environment 240. Notably, while implementations described herein describe IVR application platform 230 as being hosted in cloud computing environment 240, in some implementations, IVR application platform 230 might not be cloud-based (i.e., may be implemented outside of a cloud computing environment) or may be partially cloud-based.

Cloud computing environment 240 includes an environment that hosts IVR application platform 230. Cloud computing environment 240 may provide computation, software, data access, storage, and/or other services that do not require end-user knowledge of a physical location and configuration of system(s) and/or device(s) that host IVR application platform 230. In some implementations, cloud computing environment 240 may include an environment that hosts IVR media platform 220 (e.g., in addition to IVR application platform 230, without IVR application platform 230, etc.). As shown, cloud computing environment 240 may include a group of computing resources 231 (referred to collectively as "computing resources 231" and individually as "computing resource 231").

Computing resource 231 may include one or more personal computers, workstation computers, server devices, or another type of computation and/or communication device. In some implementations, computing resource 231 may host IVR application platform 230. The cloud resources may include compute instances executing in computing resource 231, storage devices provided in computing resource 231, data transfer devices provided by computing resource 231, etc. In some implementations, computing resource 231 may communicate with other computing resources 231 via wired connections, wireless connections, optical connections, or a combination of wired and wireless connections.

As further shown in FIG. 2, computing resource 231 may include a group of cloud resources, such as one or more applications ("APPs") 231-1, one or more virtual machines ("VMs") 231-2, virtualized storage ("VSs") 231-3, one or more hypervisors ("HYPs") 231-4, or the like.

Application 231-1 includes one or more software applications that may be provided to or accessed by user device 210. Application 231-1 may eliminate a need to install and execute the software applications on user device 210. For example, application 231-1 may include software associated with IVR application platform 230 and/or any other software capable of being provided via cloud computing environment 240. In some implementations, one application 231-1 may send/receive information to/from one or more other applications 231-1, via virtual machine 231-2.

Virtual machine 231-2 includes a software implementation of a machine (e.g., a computer) that executes programs like a physical machine. Virtual machine 231-2 may be either a system virtual machine or a process virtual machine, depending upon use and degree of correspondence to any real machine by virtual machine 231-2. A system virtual machine may provide a complete system platform that supports execution of a complete operating system ("OS"). A process virtual machine may execute a single program, and may support a single process. In some implementations, virtual machine 231-2 may execute on behalf of a user (e.g., user device 210), and may manage infrastructure of cloud computing environment 240, such as data management, synchronization, or long-duration data transfers.

Virtualized storage 231-3 includes one or more storage systems and/or one or more devices that use virtualization techniques within the storage systems or devices of computing resource 231. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 231-4 provides hardware virtualization techniques that allow multiple operating systems (e.g., "guest operating systems") to execute concurrently on a host computer, such as computing resource 231. Hypervisor 231-4 may present a virtual operating platform to the guest operating systems, and may manage the execution of the guest operating systems. Multiple instances of a variety of operating systems may share virtualized hardware resources.

Routing platform 250 includes one or more devices capable of receiving, storing, generating, processing, and/or providing information associated with an IVR service. For example, routing platform 250 may include a server device or a group of server devices. In some implementations, routing platform 250 may orchestrate IVR calls by sending instructions to and/or receiving instructions from one or more other devices. In some implementations, routing platform 250 may receive a request for an IVR service, and may provide the request and/or information associated with the request to IVR application platform 230.

In some implementations, prior to a call being established, routing platform 250 may handshake with IVR media platform 220. In some implementations, routing platform 250 may orchestrate the termination of a communication session associated with an IVR service. In some implementations, routing platform 250 may serve as an intermediary between IVR application platform 230 and call center 270. For example, routing platform 250 may receive an indication to connect a caller to a customer service agent of call center 270, and may interact with call center 270 to identify a customer service agent to service the call.

Data source 260 includes one or more devices capable of receiving, storing, processing, and/or providing information associated with an IVR service. For example, data source 260 may include a server device or a group of server devices. In some implementations, data source 260 may receive a request, from IVR application platform 230, for information associated with a user account and/or user device 210. In some implementations, data source 260 may provide, to IVR application platform 230, information associated with the user account and/or user device 210.

Call center 270 includes one or more devices capable of receiving, storing, processing, and/or providing information associated with an IVR service. For example, call center 270 may include a server device or a group of server devices. In some implementations, call center 270 may receive a request from IVR application platform 230 to connect user device 210 with a device associated with a customer service agent. In some implementations, call center 270 may establish a connection between a device associated with a customer service agent and user device 210.

Network 280 may be one or more wired and/or wireless networks. For example, network 280 may include a cellular network (e.g., a fifth generation (5G) network, a fourth generation (4G) network, such as a long-term evolution (LTE) network, a third generation (3G) network, a code division multiple access (CDMA) network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
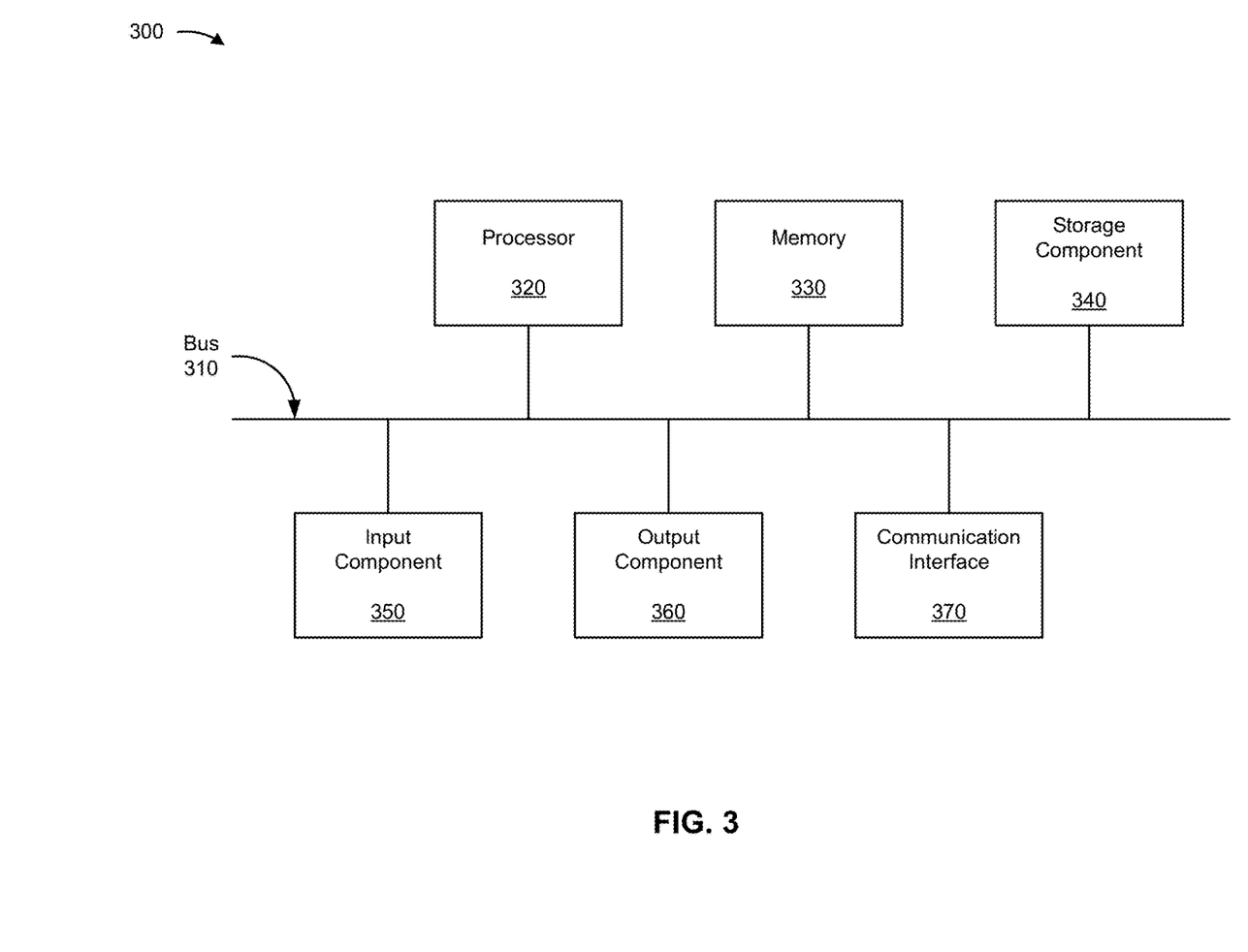
FIG. 3 is a diagram of example components of one or more devices of FIG. 2.

FIG. 3 is a diagram of example components of a device 300. Device 300 may correspond to user device 210, IVR media platform 220, IVR application platform 230, routing platform 250, data source 260, and/or call center 270. In some implementations, user device 210, IVR media platform 220, IVR application platform 230, routing platform 250, data source 260, and/or call center 270 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
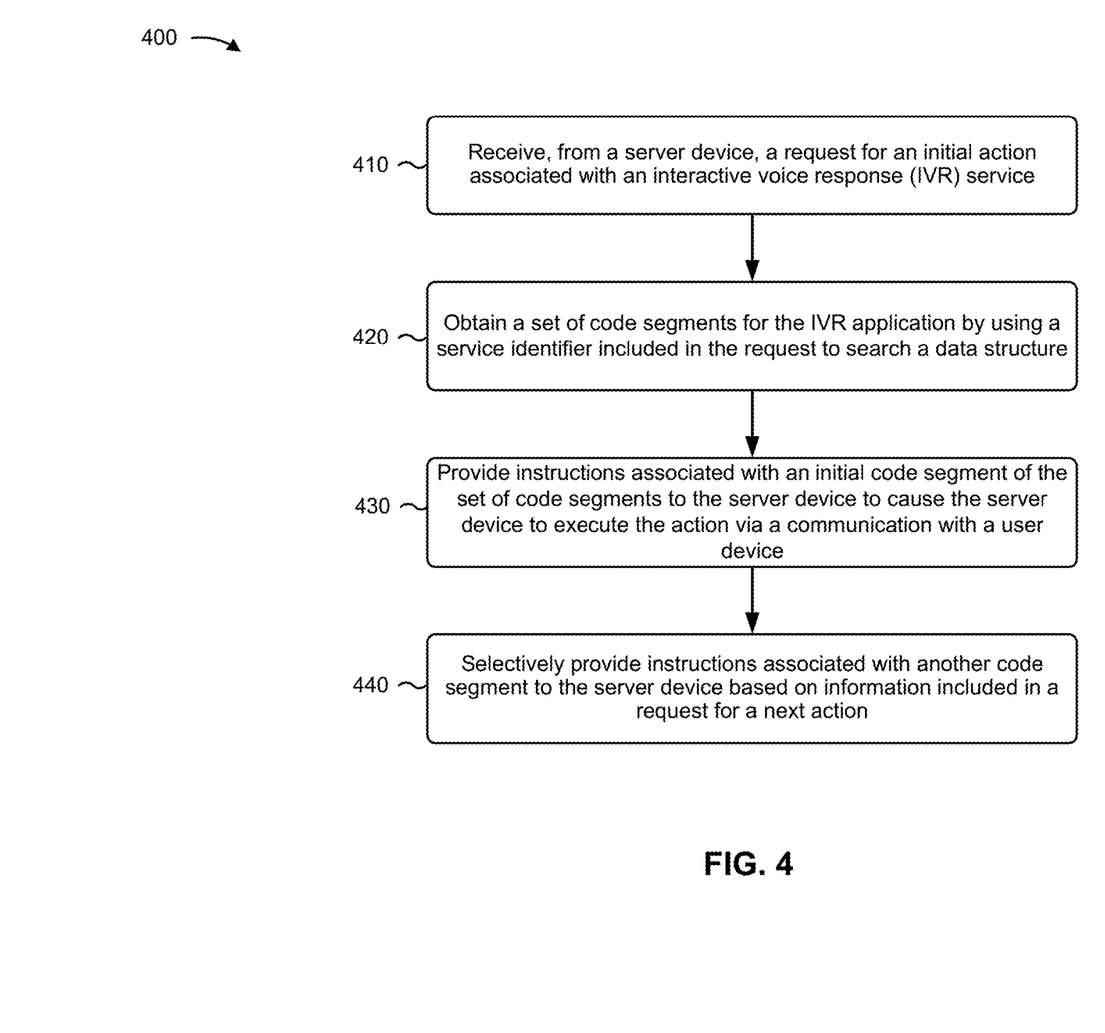
FIG. 4 is a flow chart of an example process for using a data structure driven IVR framework to provide an IVR service to a user device.

FIG. 4 is a flow chart of an example process 400 for using a data structure driven IVR framework to provide an IVR service to a user device. In some implementations, one or more process blocks of FIG. 4 may be performed by IVR application platform 230. In some implementations, one or more process blocks of FIG. 4 may be performed by another device or a group of devices separate from or including IVR application platform 230, such as user device 210, IVR media platform 220, routing platform 250, data source 260, and/or call center 270.

As shown in FIG. 4, process 400 may include receiving, from a server device, a request for an initial action associated with an interactive voice response (IVR) service (block 410). For example, IVR media platform 220 may receive, from user device 210, a communication associated with an IVR service, which may cause IVR media platform 220 to provide, to IVR application platform 230, a request for an initial action associated with an IVR application that supports the IVR service. An initial action may include any action associated with an IVR service, such as playing an announcement, playing a list of menu options, obtaining information through a back-end transaction (e.g., obtaining customer account information), connecting user device 210 to call center 270 (e.g., to a device of a customer service agent), and/or the like.

In some implementations, IVR routing platform 250 may receive a communication associated with an IVR service. For example, user device 210 may provide a call request to routing platform 250 (e.g., by dialing a 1-800 number). In this case, routing platform 250 may handshake with IVR media platform 220. The handshake may include a call identifier (e.g., an MDN, a 1-800 number, etc.), and may cause the call between user device 210 and IVR media platform 220 to be established. In this case, as described herein, IVR media platform 220 may interact with IVR application platform 230 to provide an IVR service.

In some implementations, IVR media platform 220 may receive a communication associated with an IVR service. For example, a user may interact with user device 210 (e.g., via a touchtone screen, via a voice command, etc.) to establish a communication session with IVR media platform 220. This may allow user device 210 to utilize a service offered by a particular IVR application. In this case, the communication may include a device identifier (e.g., a mobile device number (MDN)), a service identifier associated with the IVR service offered by the IVR application (e.g., a 1-800 or 1-900 number), and/or the like.

In some implementations, IVR application platform 230 may receive a request for an initial action associated with the IVR service. For example, IVR media platform 220 may provide a request (e.g., a hypertext transfer protocol (HTTP) request) to IVR application platform 230 for an initial action associated with the IVR application. In this case, the request may include the device identifier and the service identifier, and, by receiving the request, IVR application platform 230 may use the service identifier to obtain code segments for the IVR application, as described further herein.

In some implementations, IVR application platform 230 may receive the request periodically, according to a schedule, based on a user of user device 210 initiating a communication with IVR media platform 220, based on IVR application platform 230 generating the request (e.g., automatically, without user interaction), and/or the like. In some implementations, the communication with user device 210 may be a telephone call, a message (e.g., a text message or a short message services (SMS) message), an email, and/or the like.

In this way, IVR application platform 230 is able to receive a request for an action associated with an IVR application.

As further shown in FIG. 4, process 400 may include obtaining a set of code segments for the IVR application by using a service identifier included in the request to search a data structure (block 420). For example, IVR application platform 230 may analyze the request to identify a service identifier, and IVR application platform 230 may use the service identifier to search a data structure for a set of code segments for the IVR application. A code segment may include one or more lines of code that may be used to carry out logic of an IVR application, such as identifying a message to play to user device 210 (e.g., a menu, an announcement, etc.), obtaining data from data source 260 (e.g., customer account information), interacting with call center 270 to establish a call between user device 210 and a device of a customer service agent, and/or the like.

In some implementations, IVR application platform 230 may use a data structure to store a set of code segments associated with the IVR application. For example, IVR application platform 230 may store a set of code segments using a database, an array, a linked-list, a hash table, a tree, and/or the like. In some cases, the data structure may associate the set of code segments with a service identifier for the IVR application. Additionally, the data structure may associate configuration information with the set of code segments. For example, configuration information may indicate which code segment is the initial code segment to allow IVR application platform 230 to determine which code segment to translate and provide to IVR media platform 220.

In some implementations, IVR application platform 230 may use a set of database tables to store the set of code segments. For example, the set of code segments may be stored using a segment table, a prompt table, an IVR configuration table, and/or the like. In this case, the segment table may include a code segment identifier for each code segment, an action field indicating an action to take that is associated with each code segment, a list of one or more triggers for a current code segment, a list of triggers to a next code segment (e.g., if a user enters 1, trigger code segment X, if a user enters 2, trigger code segment Y), and/or the like.

The prompt table may include a code segment identifier, message information (e.g., a value indicating a particular announcement or a particular menu option, a dynamic value such as a value providing a user account balance, etc.), and/or the like. The IVR configuration table may include application configuration information, such as whether a caller may interrupt a menu and pre-emptively select an option, links to data sources 260 (e.g., a uniform resource locator (URL) to a production server that stores user account information) and/or call center 270, and/or the like.

In some implementations, IVR application platform 230 may analyze the request to identify a service identifier. For example, IVR application platform 230 may execute a call initialization technique (e.g., a call bootstrap) that uses a DNIS to analyze the request to identify the service identifier.

In some implementations, IVR application platform 230 may obtain a set of code segments. For example, IVR application platform 230 may use the service identifier to search the data structure for a set of code segments for the IVR application.

Additionally, IVR application platform 230 may, using information included in the set of code segments, obtain additional information that may be used to provide the IVR service. For example, IVR application platform 230 may obtain user account information from data source 260. In this case, the set of code segments may include a URL to a server that stores user account information, and IVR application platform 230 may access the URL to obtain the user account information using the device identifier (e.g., the MDN) included in the request for the initial action. In this way, if user device 210 requests user account information, IVR application platform 230 may provide the user account information upon receiving security credentials (e.g., without having to query data source 260 in real-time).

In some implementations, servers associated with IVR application platform 230 may be configured the load the set of code segments using cache memory. For example, rather than obtaining the set of code segments after receiving a request from IVR media platform 220, the servers associated with IVR application platform 230 may load the set of code segments to cache memory (e.g., during server boot-up, at any point prior to a call, etc.). Additionally, if a user updates the IVR application, then the servers associated with IVR application platform 230 may re-load the set of code segments to cache memory.

In this way, IVR application platform 230 obtains a set of code segments that may be used to provide an IVR service to user device 210. By using a data structure to store a set of code segments for the IVR application, rather than having the code segments hard coded into the IVR application (e.g., which may be tightly coupled to an IDE of a particular IVR vendor), IVR application platform 230 conserves processing resources relative to an IVR application platform that stores logic in the actual IVR application. For example, storing code segments in a data structure allows for seamless modification and/or replacement of IVR applications because a modification or a replacement is implemented by updating a data structure entry, rather than updating application code on one or more server devices within IVR application platform 230.

Additionally, by storing and accessing code segments via a data structure, IVR application platform 230 provides a dynamically changeable, robust solution. Furthermore, by using the data structure to store code segments, IVR application platform 230 conserves memory resources. For example, assume IVR application platform 230 includes 100 data center servers that collectively support 1,000 IVR applications (e.g., by obtaining code segments for the IVR applications from the data structure when a call is made). By obtaining the code segments from the data structure, rather than storing application code for the 1,000 IVR applications locally on each of the 100 data center servers, IVR application platform 230 conserves memory resources. Additionally, by using uniform storage, IVR application platform 230 is able to concurrently support multiple IVR systems.

As further shown in FIG. 4, process 400 may include providing instructions associated with an initial code segment of the set of code segments to the server device to cause the server device to execute the action via a communication with a user device (block 430). For example, IVR application platform 230 may identify an initial code segment, translate the initial code segment to instructions capable of being processed by IVR media platform 220, and may provide the instructions to IVR media platform 220.

In some implementations, IVR application platform 230 may identify an initial code segment. For example, IVR application platform 230 may identify an initial code segment while executing the call initialization technique. In some cases, an initial code segment for the IVR application may be flagged in the data structure as the initial code segment, may be associated with the session identifier (e.g., DNIS), or the like. In this way, IVR application platform 230 may identify the initial code segment that may be used to provide user device 210 with the IVR service.

In some implementations, IVR application platform 230 may translate the initial code segment to instructions capable of being processed by IVR media platform 220. For example, IVR application platform 230 may perform a translation technique (e.g., an extensible markup language (XML) translation technique) to translate one or more values included in the initial code segment to a format capable of being processed by IVR media platform 220.

As an example, assume user device 210 calls a 1-800 number to request an account balance. Further assume that a set of code segments for the 1-800 number service include an initial code segment to display a menu of call options to user device 210. In this case, IVR application platform 230 may translate values for the menu of call options to an XML format to allow IVR media platform 220 to provide the menu of call options to user device 210 (e.g., via a voice recording).

In some implementations, IVR application platform 230 may provide the instructions to IVR media platform 220. For example, IVR application platform 230 may provide the instructions to IVR media platform 220 to cause IVR media platform 220 to execute the initial action associated with the initial code segment.

In this way, IVR application platform 230 is able to use code segments from the data structure to orchestrate providing an IVR service to user device 210.

As further shown in FIG. 4, process 400 may include selectively providing instructions associated with another code segment to the server device based on information included in a request for a next action (block 440). For example, IVR application platform 230 may receive, from IVR media platform 220, a request for a next action associated with the IVR application, may identify another code segment using information included in the request, and may provide instructions associated with the other code segment to IVR media platform 220. In this case, IVR media platform 220 may execute the next action via the communication with user device 210. The next action may include any action associated with an IVR service, such as playing an announcement, playing a list of menu options, obtaining information through a back-end transaction (e.g., obtaining customer account information), connecting user device 210 to a device of a customer service agent, and/or the like.

In some implementations, IVR application platform 230 may receive a request for a next action. For example, a user may interact with user device 210 (e.g., via touchtone, via voice) to provide a communication to IVR media platform 220. As an example, a user may input an option between 0 and 9. In this case, IVR media platform 220 may use information included in the communication (e.g., the value for the menu option between 0 or 9) to generate a request for a next action associated with the IVR service, and may provide the request to IVR application platform 230.

In some implementations, IVR application platform 230 may identify another code segment. For example, IVR application platform 230 may analyze information included in the request to identify the value indicating the menu option between 0 and 9, and may use the menu option value to identify a code segment that is associated with the value. As an example, assume the request includes a value indicating an option to obtain an account balance. In this case, IVR application platform 230 may identify a code segment that is associated with obtaining an account balance.

In some implementations, IVR application platform 230 may perform additional actions associated with the other code segment. For example, IVR application platform 230 may provide a request to call center 270 to establish a connection between user device 210 and a device associated with a customer service agent. In this case, IVR application platform 230 may receive a request to connect user device 210 to call center 270, and IVR application platform 230 may, using information (e.g., a URL) included in the other code segment, provide the request to routing platform 250. Additionally, routing platform 250 may connect to call center 270 to request to connect user device 210 to a customer service agent.

Additionally, or alternatively, IVR application platform 230 may obtain, from data source 260, customer account information, user profile information, or the like. For example, IVR application platform 230 may receive a request for customer account information, and may connect to data source 260 to obtain the customer account information.

In some implementations, IVR application platform 230 may provide instructions associated with the other code segment to IVR media platform 220. For example, IVR application platform 230 may translate one or more values associated with the other code segment to instructions capable of being processed by IVR media platform 220, and may provide the instructions to IVR media platform 220. In this case, IVR media platform 220 may execute the next action associated with the IVR application.

In some implementations, IVR application platform 230 may support a set of IVR applications using a set of application server devices. For example, assume IVR application platform 230 includes a set of application server devices that each support 1,000 or more IVR applications using virtual machines. Using a past technique, the 1,000 or more IVR applications may be supported by storing application code locally on each application server device. Additionally, the IVR applications may be tightly coupled to IDEs of a number of different IVR vendors. As such, updating or replacing IVR applications may require substantial changes to the application code on each application server device, may require modifications based on the particular IDE used with an IVR application, or the like. However, by using a data structure to store code segment for the set of IVR applications, IVR application platform 230 is able to seamlessly update and/or replace IVR applications, thereby saving resources, such as processing resources, memory resources, resources devoted to hardware and software maintenance, and/or the like.

In some implementations, IVR application platform 230 may update or modify the IVR application. For example, IVR application platform 230 may receive a request to modify the IVR application. In this case, the request may include an additional code segment, and IVR application platform 230 may update the data structure by replacing a code segment with the additional code segment. Additionally, IVR application platform 230 may deploy the IVR application that has been modified. In this way, IVR application platform 230 is able to seamlessly update the IVR application.

In some implementations, IVR application platform 230 may update or modify the IVR application without receiving a request (e.g., by a developer updating the IVR application directly from the data structure). In some implementations, IVR application platform 230 may receive a request to modify the IVR application, where the request includes a modification for a code segment. In this case, modifying a code segment may be updating a code segment (e.g., altering code within the code segment) or removing a code segment. In this case, IVR application platform 230 may update the data structure with the modification to the code segment.

In some implementations, IVR application platform 230 may replace the IVR application with another IVR application. For example, IVR application platform 230 may receive a request to deploy another IVR application that is associated with a different IVR vendor than an IVR vendor associated with the IVR application. In this case, the request may be a request to replace the IVR application with the other IVR application. Here, IVR application platform 230 may update the data structure by replacing the set of code segments with another set of code segments that are associated with the other IVR application.

Additionally, IVR application platform 230 may deploy the other IVR application using the other set of code segments. As such, IVR application code stored on servers associated with IVR application platform 230 and IVR application code stored on servers associated with IVR platform 220 may not need to be modified as part of satisfying the request to deploy the modified IVR application or the replacement IVR application.

In this way, IVR application platform 230 is able to use data structure driven code segments to orchestrate providing an IVR service to user device 210.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, IVR application platform 230 orchestrates delivery of an IVR service to user device 210 using code segments obtained from a data structure. Furthermore, IVR application platform 230 conserves processing resources when modifying or replacing an IVR application relative to an IVR application platform that stores logic code locally. For example, if an IVR application is supported on 100 or more server devices in a data center, the IVR application may be updated or replaced by updating the data structure used to store the code segments associated with the IVR application (rather than updating application code each server device, which may be tightly coupled to an IVR vendor-provided IDE). Additionally, implementations described herein reduce application development time, reduce problems relating to application design and deployment, and/or the like.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
receive, from a server device, a request for an initial action associated with an interactive voice response (IVR) service;
analyze the request for the initial action to obtain a service identifier associated with the IVR service;
obtain a set of code segments for an IVR application that supports the IVR service by using the service identifier to search a data structure,
the set of code segments being associated with logic of the IVR application and including an initial code segment identifying the initial action associated with the IVR application;
translate the initial code segment to instructions associated with the initial code segment,
the instructions associated with the initial code segment being in a format capable of being processed by the server device;
provide the instructions associated with the initial code segment to the server device to cause the server device to execute the initial action via a communication with a user device; and
selectively provide, to the server device, instructions associated with another code segment based on information included in a request for a next action,
the instructions associated with the other code segment to cause the server device to execute the next action via the communication with the user device.

2. The device of claim 1, where the initial action and the other action include at least one of:
provide the user device with a menu of options,
provide the user device with an announcement,
obtain information from an external data source, or
connect the user device with a device associated with a customer service agent.

3. The device of claim 1, where the one or more processors are further to:
receive, after selectively providing instructions associated with the other code segment, a request to modify the IVR application, the request to modify the IVR application including an additional code segment or a modification for a first code segment, of the set of code segments; and update the data structure by replacing a code segment, of the set of code segments, with the additional code segment or by updating the data structure with the modification to the first code segment.

4. The device of claim 3, where IVR application code stored on the device and IVR application code stored on the server device are not modified as part of satisfying the request to modify the IVR application.

5. The device of claim 1, where the one or more processors, when selectively providing the instructions associated with the other code segment, are to:

receive, from the server device, the request for the next action, identify the other code segment based on information included in the request for the next action, the other code segment identifying the next action, and provide the instructions associated with the other code segment to the server device to cause the server device to execute the next action via the communication with the user device.

6. The device of claim 1, where the one or more processors, when selectively providing the instructions associated with the other code segment, are to:

receive, from the server device, a request for the next action, the next action being a request for user account information, identify the other code segment based on information included in the request for the next action, obtain the user account information from an external data source using information included in the other code segment, and provide the instructions associated with the other code segment to the server device, the instructions including the user account information.

7. A non-transitory computer-readable medium storing instructions, the instructions comprising:

one or more instructions that, when executed by one or more processors, cause the one or more processors to:

receive, from a server device, a request for an initial action associated with an interactive voice response (IVR) service, the request for the initial action including a service identifier associated with the IVR service;

obtain a set of code segments for an IVR application that supports the IVR service by using the service identifier to search a data structure, the set of code segments being associated with logic of the IVR application;

identify an initial code segment of the set of code segments, the initial code segment identifying the initial action associated with the IVR application;

translate the initial code segment to instructions associated with the initial code segment, the instructions associated with the initial code segment being in a format capable of being processed by the server device;

provide the instructions associated with the initial code segment to the server device to cause the server device to execute the initial action via a communication with a user device; and selectively provide, to the server device, instructions associated with another code segment based on information included in a request for a next action, the instructions associated with the other code segment to cause the server device to execute the next action via the communication with the user device.

8. The non-transitory computer-readable medium of claim 7, where the one or more instructions, when executed by the one or more processors, further cause the one or more processors to:

update the data structure, after selectively providing instructions associated with the other code segment, by replacing a code segment, of the set of code segments, with an additional code segment, or by updating the code segment, of the set of code segments, with a modification to the code segment; and deploy the IVR application using the additional code segment or using the modification to the code segment.

9. The non-transitory computer-readable medium of claim 7, where the one or more instructions, when executed by the one or more processors, further cause the one or more processors to:

receive, after selectively providing instructions associated with the other code segment, a request to deploy another IVR application that is associated with a different IVR vendor than the IVR application, the other IVR application to replace the IVR application;

update the data structure by replacing the set of code segments with another set of code segments that are associated with the other IVR application; and deploy the other IVR application using the other set of code segments.

10. The non-transitory computer-readable medium of claim 7, where the one or more instructions, when executed by the one or more processors, further cause the one or more processors to:

receive, after selectively providing instructions associated with the other code segment, a request to deploy another IVR application using a different integrated develop environment (IDE) than an IDE used to support the IVR application;

update the data structure by replacing the set of code segments with another set of code segments that are associated with the other IVR application; and deploy the other IVR application using the other set of code segments.

11. The non-transitory computer-readable medium of claim 7, where the one or more instructions, that cause the one or more processors to obtain the set of code segments by using the service identifier to search the data structure, cause the one or more processors to:

search, using the service identifier, the data structure for the set of code segments, and receive, from the search, configuration information and the set of code segments, the configuration information including an instruction identifying a code segment of the set of code segments as the initial code segment.

12. The non-transitory computer-readable medium of claim 7, where the one or more instructions, that cause the one or more processors to selectively provide the instructions associated with the other code segment, cause the one or more processors to:

receive, from the server device, the request for the next action, identify the other code segment based on information included in the request for the next action,
the other code segment identifying the next action, and
provide the instructions associated with the other code segment to the server device to cause the server device to execute the next action via the communication with the user device.

13. The non-transitory computer-readable medium of claim 7, where the one or more instructions, that cause the one or more processors to selectively provide the instructions associated with the other code segment, cause the one or more processors to:
receive, from the server device, the request for the next action,
the next action being a request to connect the user device to a device associated with a customer service agent,
identify the other code segment based on information included in the request for the next action,
provide the instructions associated with the other code segment to the server device,
the instructions including a message to notify the user device that a connection to the device associated with the customer service agent is being established, and
provide a request to establish the connection between the user device and the device associated with the customer service agent using information included in the other code segment.

14. A method, comprising:
receiving, by a device and from a server device, a request for an initial action associated with an interactive voice response (IVR) service;
analyzing, by the device, the request for the initial action to obtain a service identifier associated with the IVR service;
obtaining, by the device, an initial code segment of a set of code segments for an IVR application that supports the IVR service by using the service identifier to search a data structure,
the set of code segments being associated with logic of the IVR application;
translating, by the device, the initial code segment to instructions associated with the initial code segment,
the instructions associated with the initial code segment being in a format capable of being processed by the server device;
providing, by the device, the instructions associated with the initial code segment to the server device to cause the server device to execute the initial action via a communication with a user device; and
selectively providing, by the device and to the server device, instructions associated with another code segment based on information included in a request for a next action,
the instructions associated with the other code segment to cause the server device to execute the next action via the communication with the user device.

15. The method of claim 14, further comprising:
receiving, after selectively providing instructions associated with the other code segment, a request to modify the IVR application,
the request to modify the IVR application including a modification for a code segment, of the set of code segments; and
updating the data structure by updating a code segment, of the set of code segments, with the modification for the code segment.

16. The method of claim 14, further comprising:
receiving, after selectively providing instructions associated with the other code segment, a request to deploy another IVR application that is associated with a different IVR vendor than the IVR application,
the other IVR application to replace the IVR application;
updating the data structure by replacing the set of code segments with another set of code segments that are associated with the other IVR application; and
deploying the other IVR application using the other set of code segments.

17. The method of claim 16, where IVR application code stored on the device and IVR application code stored on the server device are not modified as part of satisfying the request to deploy the other IVR application.

18. The method of claim 14, where selectively providing the instructions associated with the other code segment comprises:
receiving, from the server device, the request for the next action,
obtaining the other code segment by using information included in the request for the next action to search the data structure,
translating the other code segment to the instructions associated with the other code segment,
the instructions associated with the other code segment being in a format capable of being processed by the server device, and
providing the instructions associated with the other code segment to the server device.

19. The method of claim 14, wherein the other code segment is obtained by searching the data structure using the information included in the request for the next action.

20. The device of claim 1, where:
each code segment included in the set of code segments includes one or more lines of code associated with the logic of the IVR application; and
the one or more processors, when translating the initial code segment to instructions associated with the initial code segment, are to:
translate one or more values included in the initial code segment to the format capable of being processed by the server device.

* * * * *